(12) United States Patent
Sachs et al.

(10) Patent No.: US 8,213,382 B2
(45) Date of Patent: Jul. 3, 2012

(54) TECHNIQUE FOR CONTROLLING HANDOVERS WITHIN A MULTI-RADIO WIRELESS COMMUNICATION SYSTEM

(75) Inventors: Joachim Sachs, Aachen (DE); Per Magnusson, Linkoping (SE); Arne Simonsson, Gammelstad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 965 days.

(21) Appl. No.: 11/915,706

(22) PCT Filed: May 30, 2005

(86) PCT No.: PCT/EP2005/005805
§ 371 (c)(1),
(2), (4) Date: Nov. 27, 2007

(87) PCT Pub. No.: WO2006/128479
PCT Pub. Date: Dec. 7, 2006

(65) Prior Publication Data
US 2009/0017823 A1    Jan. 15, 2009

(51) Int. Cl.
*H04W 4/00* (2009.01)
(52) U.S. Cl. ........................................ 370/331; 370/332
(58) Field of Classification Search ........................ None
See application file for complete search history.

(56) References Cited

U.S. PATENT DOCUMENTS

| | | | |
|---|---|---|---|
| 5,722,072 A * | 2/1998 | Crichton et al. | 455/437 |
| 6,370,357 B1 * | 4/2002 | Xiao et al. | 455/67.11 |
| 6,597,673 B1 * | 7/2003 | Nobuyasu et al. | 370/331 |
| 6,859,654 B1 * | 2/2005 | Reynolds et al. | 455/437 |
| 2003/0193910 A1 * | 10/2003 | Shoaib et al. | 370/331 |
| 2004/0170191 A1 * | 9/2004 | Guo et al. | 370/468 |
| 2004/0208126 A1 * | 10/2004 | Wassew et al. | 370/235 |
| 2006/0291455 A1 * | 12/2006 | Katz et al. | 370/355 |
| 2009/0207811 A1 * | 8/2009 | Zhu et al. | 370/332 |

FOREIGN PATENT DOCUMENTS

EP    1 014 107 A    6/2000

* cited by examiner

*Primary Examiner* — John Blanton

(57) ABSTRACT

A technique is provided for use by a Multi-Radio Management Resource (MRRM) component of a multi-radio wireless communication system for controlling the handover of a mobile terminal between different radio access technologies (RAT). In one example, all suitable RATs having coverage areas currently covering the location of a mobile terminal are identified. The performance gain that might be achieved via a handover to one of the other RATs is then determined by the MRRM based on various performance gain factors. Handover costs that will be incurred as a result of the handover are also explicitly calculated. Then, a cost-adjusted gain is determined by the MRRM based on the performance gain and the handover costs. A handover is only triggered by the MRRM if the cost-adjusted gain exceeds a minimum threshold. The speed and trajectory of the mobile terminal may also be considered.

22 Claims, 4 Drawing Sheets

MULTI-RADIO MOBILE COMMUNICATION SYSTEM

TECHNIQUE FOR CONTROLLING HANDOVERS WITHIN A MULTI-RADIO WIRELESS COMMUNICATION SYSTEM

FIELD OF THE INVENTION

The invention generally relates to wireless communication systems and in particular to a technique for controlling mobile terminal handovers within a multi-radio wireless system.

BACKGROUND OF THE INVENTION

Handover was traditionally performed within wireless communication systems only when a mobile terminal, such as a mobile telephone, moved from one cellular coverage area to another. To accommodate the transition from one coverage area to another, the base station handling a mobile communication session for the mobile terminal would hand over control of the communication session to the base station of the new coverage area just before the mobile terminal entered the new coverage area. In other words, handover was only performed when deemed necessary to accommodate relocation of the mobile terminal. Some relatively modest amount of overlap of coverage was typically provided between adjacent cells to accommodate a smooth handover without risk of interruption of the communication session, i.e. without dropping the call.

With the proliferation of mobile communication systems, particularly with the advent of so-called "picocells", "umbrella cells", etc., there is now much greater overlap of coverage areas. A mobile terminal may now be positioned at a location covered by multiple base stations corresponding to multiple coverage areas. Accordingly, handovers need not be performed only because a mobile terminal is moving out of one discrete coverage area and into another. Rather, handovers can advantageously be performed even if the mobile terminal is stationary. For example, a handover may be performed whenever an improvement in performance can be achieved by switching a communication session from one base station to another. Performance can be a fairly complicated function of a variety of signalling parameters. Typically, though, an improvement in performance is achieved if a communication session can be reliably accommodated using less power by a different base station.

Accordingly, a wireless communication system can evaluate the performance gain, if any, that can be achieved by switching from the base station currently controlling a communication session of the mobile terminal and any other base stations having coverage areas overlapping the location of the mobile terminal. A handover is then made to the base station providing the greatest performance gain. By ensuring that each communication session is controlled by the base station providing the best performance, overall system resources are thereby conserved so as to improve overall system bandwidth to accommodate a greater number of calls at any given time. To prevent the system from frequently switching a given communication session back-and-forth between overlapping base stations due to slight variations in relative performance, a minimum "hysteresis" margin may be employed. A handover is only performed if the expected performance gain exceeds the margin.

Although the use of performance gain to determine whether to perform a handover is useful, considerable room for improvement remains. In particular, current communication systems do not explicitly take into account all aspects associated with a handover. In some cases, although a performance gain can be achieved with the handover, the overall situation after the handover might not yet be optimal. The aforementioned hysteresis margin is merely a minimum threshold provided to prevent frequent back-and-forth switching between base stations. Hence, although the performance gain may exceed the hysteresis threshold thus triggering a handover, a net loss of resources might result.

An optimized handover approach is particularly problematic within "Beyond Third Generation" (B3G) communication systems, which simultaneously employ different radio access technologies (RATs) such as Global System for Mobile Communications (GSM) technologies, Universal Mobile Telecommunications Systems (UMTS) employing wideband code-division multiple access (WCDMA) technologies, Super Third Generation (S3G) technologies, Wireless Local Area Network (WLAN) technologies, and Worldwide Interoperability for Microwave Access (WiMAX) technologies. Within B3G systems, a mobile terminal may be located within overlapping coverage areas employing entirely different RATs, as shown in FIG. 1, each having their own controllers interconnected to one another via a Multi-Radio Network Controller (MRNC). The overlapping coverage areas might also include coverage areas using the same RAT but administered by different operators, as shown in FIG. 1 by way of GSM A and GSM B. The problems associated with performing a resource-efficient handover between different RATs or between the same RAT administered by different operators can be significant. These problems can be even more significant if the mobile terminal is also in motion, particularly at high speed perhaps within an automobile or train, because high speed movement may trigger frequent handovers as the mobile terminal passes through various coverage areas, remaining in some areas only briefly.

Within a B3G system, the handover of a mobile terminal from one RAT to another is controllable by a Multi-Radio Resource Management (MRRM) function. Some of the problems associated with performing handovers between different RATs are discussed on "Handover Between WCDMA and GSM", Ericsson Review, No. 1, pages 6-11, 2003. See also U.S. Patent Application 2002/0160785, of Ericsson, entitled "Commanding Handover between Differing Radio Access Technologies" and U.S. Patent Application 2004/0090937 of Nokia, entitled "Method and Apparatus for Performing Inter-Technology Handoff from WLAN to Cellular Network." However, these documents do not set forth techniques that adequately address the above problems associated with handovers between different RATs.

Accordingly, there is a need to provide techniques that efficiently trigger handovers, particularly within B3G systems, and it is to that end that the present invention is primarily directed.

SUMMARY OF THE INVENTION

In accordance with the invention, techniques are provided for use by a multi-radio wireless communication system for controlling the handover of a mobile terminal between different RATs, wherein the handover is controlled based on cost-adjusted gain values that depend, at least in part, on characteristics of the RATs.

A method implementation is provided that comprises the steps of: identifying RATs having coverage areas currently covering the location of the mobile terminal, determining a performance gain between a current RAT and other RATs currently covering the location of the mobile terminal based on performance gain factors, determining handover costs between the current RAT and other RATs based on handover cost factors, determining a cost-adjusted gain based on the performance gain and the handover costs, identifying the RAT having the largest cost-adjusted gain, and then triggering handover of the mobile terminal to the RAT having the largest cost-adjusted gain.

The performance gain factors may depend on characteristics of the RATs and can be representative of one or more of the frequency band, data rate, security support, free capacity, cell load, signal strength, channel quality, service efficiency and spectral efficiency of the RATs as well as service class factors. The handover cost factors may likewise depend on characteristics of the RATs and can be representative of one or more of data loss, switching delay, signalling overhead, protocol interaction, link characteristics, switching algorithms, and switching point locations of the RATs as well as service class. Different operators may operate the different RATs, and the cost-adjusted gain values may depend on the particular operator.

In one example, the step of triggering handover of the mobile terminal is only performed if the cost-adjusted gain of the RAT to receive the handover satisfies a predefined condition. For example, the handover may be triggered if the cost-adjusted gain exceeds a minimum threshold.

The cost-adjusted gain values may be further adjusted based on mobility. In one implementation, at least one of a time period during which gains from a switch to another RAT could be achieved (based on the motion of the mobile terminal) and the frequency at which handovers are anticipated within another RAT (based on the motion of the mobile terminal) are estimated. Based on this estimation, a mobility-compensated cost-adjusted gain is determined based on performance gain, handover costs, and at least one of the estimated time periods and the estimated frequencies. In another implementation, prestored estimates of the average time period during which gains from a switch to another RAT are achieved are retrieved and/or prestored estimates of the average handover rate at which handovers occur within another RAT are retrieved, then a mobility-compensated cost-adjusted gain is determined based on performance gain, handover costs, and at least one of the average time period and the average handover rate.

A device implementation is also provided that comprises: a coverage area determination unit operative to identify RATs having coverage areas currently covering a current location of the mobile terminal, a performance gain determination unit operative to determine a performance gain between a current RAT controlling communications with the mobile terminal and other RATs based on performance gain factors, a handover cost determination unit operative to determine handover costs between the current RAT and the other RATs based on handover cost factors, a cost-adjusted gain determination unit operative to determine a cost-adjusted gain based on the performance gain and the handover costs, and a handover triggering unit operative to identify the RAT having the largest cost-adjusted gain and to selectively trigger handover of the mobile terminal to the RAT having the largest cost-adjusted gain.

In one example of the device, a mobility compensation unit is provided that is operative to compensate the cost-adjusted gain based on the motion of the mobile terminal. In the example, the mobility compensation unit can be operative to estimate at least one of time periods during which gains from a switch to the other RATs could be achieved (based on the motion of the mobile terminal) and frequencies at which handovers are anticipated within other RATs (based on the motion of the mobile terminal), and then determine a mobility-compensated cost-adjusted gain based on performance gain, handover costs, and at least one of the estimated time periods and the estimated frequencies.

The RATs may include one or more of GSM, UMTS, S3G, WLAN, and WiMAX as well as High Speed Download Packet Access (HSDPA) technologies, IEEE-specific technologies such as 802.11; 802.16; 802.20; 802.22; and 802.15, but the principles invention may potentially be exploited within other RATs configured in accordance with other standards and protocols. The method or device in which the invention is implemented may be, for example, an MRRM component separate from the individual RATs, but principles of the invention may potentially be exploited within (or be distributed among) various components of the individual RATs as well. That is, the functions may be decentralized in some implementations but centralized in others. Also, some or all of the features of the invention may be implemented within the mobile terminal itself.

The invention can be implemented as a hardware solution or as a computer program product comprising program code portions for performing the steps of the invention when the computer program product is run on a computing device. The computer program product may be stored on a data carrier in fixed association with or removable from the computing device.

BRIEF DESCRIPTION OF THE DRAWINGS

In the following, the invention will be described with reference to an exemplary embodiment illustrated in the accompanying figures, in which.

DETAILED DESCRIPTION OF THE PREFERRED EMBODIMENTS

In the following description, for the purposes of explanation and not limitation, specific details are set forth to provide a thorough understanding of the invention. It will be apparent to one skilled in the art that the invention may be practiced in other embodiments that depart from these specific details. In particular, those skilled in the art will appreciate that the functions explained herein below may be implemented using individual hardware circuitry, using a software functioning in conjunction with a programmed microprocessor or general purpose computer, using an application specific integrated circuit (ASIC) and/or using one or more digital signal processors (DSPs).

Figure 1:
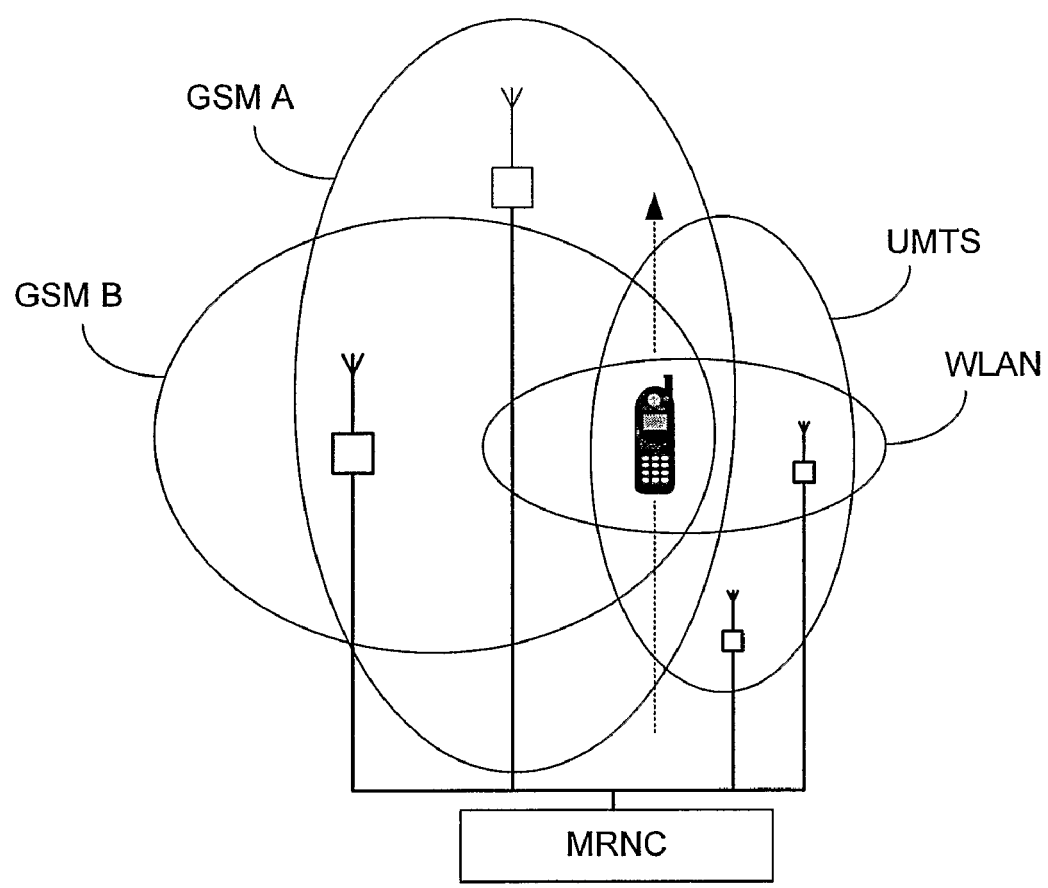
FIG. 1 illustrates a mobile terminal and overlapping RAT coverage areas of a multi-radio mobile communication system.
Figure 2:
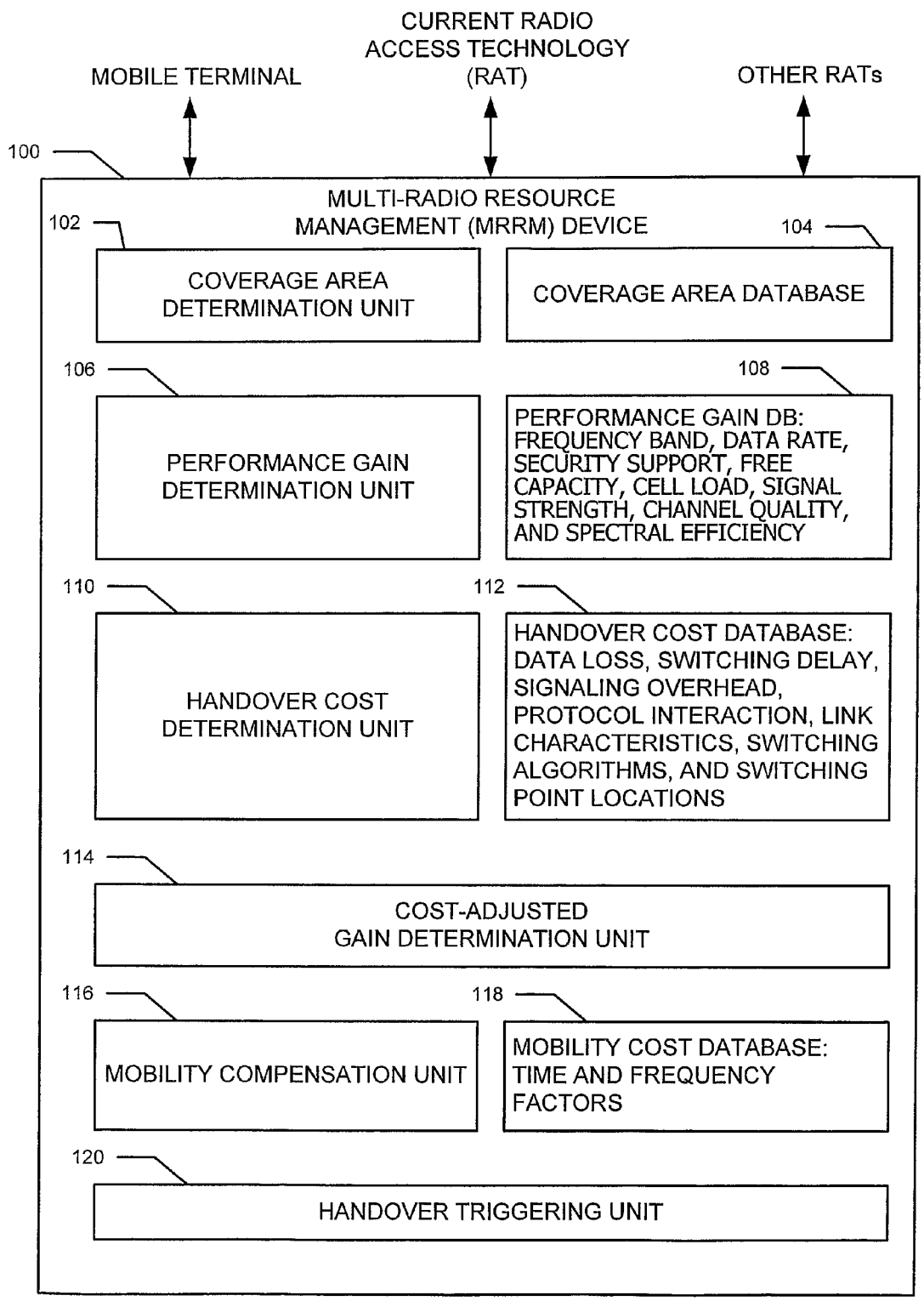
FIG. 2 illustrates selected components of an MRRM component of a multi-radio mobile communication system for controlling handover based on cost-adjusted gain values.

FIG. 2 illustrates pertinent components of an MRRM function or component 100 of a multi-radio communication system. MRRM 100 manages resources within the multi-radio communication system and, in particular, coordinates handovers of mobile terminals from one RAT to another, such as from a network employing a GSM RAT to a network employing a WCDMA RAT or vice versa. MRRM 100 may be a stand-alone component separate from the individual RAT networks (such as a component of an MRNC) or may be implemented as a component of those RAT networks. If implemented as a component of an RAT network, MRRM 100 may, for example, be incorporated within a base station controller (BSC), radio network controller (RNC) or the like. Moreover, depending upon the implementation, individual sub-functions or sub-components of MRRM 100 may be distributed among various other devices. In some implementations, it may be feasible to incorporate all or some MRRM functions within the mobile terminals themselves. Hence, whereas for simplicity FIG. 2 illustrates a single MRRM device for performing the MRRM functions, it should be understood that the various MRRM sub-functions shown therein can be distributed among a variety of separate components or devices.

An overview of the operation of the MRRM 100 will now be provided with reference to FIG. 2. Details of its operation are then provided with reference to FIGS. 3 and 4.

MRRM 100 receives information: from a mobile terminal subject to possible handover between RATs; from the RAT currently controlling a communication session with the mobile terminal; and from other individual RATs of the overall multi-radio communication system. The RATs may exploit, e.g. GSM, UTRAN, WLAN, WiMAX, S3G or other RAT technologies. The mobile terminal is capable of communicating with two or more separate RATs. In a GSM context, a mobile terminal is typically described as a "mobile station", whereas in a UTRAN context the mobile terminal is often called a user equipment unit. As used herein, the term mobile terminal encompasses both the notion of a mobile station and the notion of a user equipment unit. The mobile terminal can be any mobile communications device such as a mobile telephone (i.e. "cellular" telephone) or laptop computer with mobile termination, and thus can be, for example, a portable device, pocket device, hand-held device or car-mounted mobile device which communicates voice and/or data with various RATs.

Based on the information received from the mobile terminal and the various RATs, a coverage area determination unit 102 of MRRM 100 identifies any other RATs covering the current location of the mobile terminal that can potentially receive a handover from the mobile terminal. To receive a handover from a mobile terminal, the RAT must be capable of communicating with the mobile terminal and must have at least one coverage area encompassing the current location of the mobile terminal. To identify the other possible RATs, coverage area determination unit 102 accesses a coverage area database 104, which provides information regarding the overlap of coverage areas. Any suitable technique may be employed for identifying other RATs providing coverage at the current location of the mobile terminal. For example, if the mobile terminal is equipped to transmit its precise location—as determined, for example, via a global positioning system (GPS)—the coverage area determination unit 102 utilizes that information along with coverage area information from database 104 to identify other suitable RATs. If the MRRM function is incorporated within the mobile terminal itself, then the mobile terminal identifies the other possible RATs simply based on the signals it receives from various BSCs and RNCs of the RATs and hence a coverage area database is not required.

Once other possible RATs have been identified, a performance gain determination unit 106 determines a possible performance gain that may be achieved by switching from the current RAT to the other possible RATs. This determination is made, e.g. using performance gain factors stored in a performance gain database 108. The performance gain factors may include, for example, frequency band, data rate, security support, free capacity, cell load, signal strength, channel quality, service efficiency and spectral efficiency information. The performance gain information is updated, as needed, based on measurements or information provided by control components of the various nodes or components of the RATs. Service efficiency relates to the capability of a RAT to transmit data of a certain service class in a radio efficient manner. For example, for a data service which requires a high data rate a WLAN RAT with high data rates has a better service efficiency than a cellular network with low data rates. In the contrary, for a speech service with a low traffic source rate, a cellular network may provide a better service efficiency. In this case the high rate of WLAN cannot be exploited by the service. In addition, the Carrier-Sense Multiple Access scheme of WLAN introduces a high overhead for the transmission of small speech frames. Furthermore, a service class may deploy a higher-layer protocol, which puts certain requirements on a RAT. E.g. the Transmission Control Protocol (TCP) prefers low transmission delay, low error rate and no packet re-ordering. In order to avoid interactions with such higher layer protocols, a RAT has a better service efficiency if it fits better to these requirements.

Some of the information, such as free capacity, is preferably updated substantially in real-time. In any case, performance gain determination unit 106 determines the performance gain that can be achieved based on handover from the current RAT to every other possible RAT identified by coverage area determination unit 102. In other words, if there are four other RATs that are capable of receiving a handover of the mobile terminal based upon its current location and capabilities, the performance gain determination unit 106 calculates a separate performance gain for each of the four possible handovers.

Next, a handover cost determination unit 110 determines the costs associated with each of the possible handovers. Costs are determined in conjunction with handover cost factors stored in a handover cost database 112. The handover cost factors may include, for example, factors pertaining to possible data loss, switching delays as well as signaling overhead, protocol interaction issues, link characteristic issues (such as link-bandwidth delay product and error characteristics), switching algorithm issues, switching point location issues (i.e. is the switching point close to a bearer gateway, in the core network, or in a mobile virtual network operator), and service dependent handover costs. The switching algorithm issues relate to type of switching procedure that is used (e.g. Session Initiation Protocol (SIP) mobility, mobile IP, Serving Radio Network Subsystem (SRNS) relocation, or channel type switching.) The switching algorithm issues also relate to any other switching procedures that might be required, such as the use of Authentication, Authorization, Accounting (AAA) procedures as well as the type of address assignment that might be required such as Dynamic Host Configuration Protocol (DHCP.) The service dependent handover costs associated with a handover may depend on the service class of the ongoing session. Different services can have different preferences towards handover performance. For example, for a speech session the handover delay should not exceed a certain value while at the same time some packet loss at handover is tolerable. In contrast, a data application using TCP is more robust towards handover delay but more sensitive towards packet loss or packet re-ordering. A handover procedure with low delay but high amount of data loss would thus result in a low cost factor for such a speech service, but at the same result in a high cost factor for such a data service.

The handover cost factors within database 112 are updated, as needed, based on information received from the individual RATs. As with gains, costs are determined for each possible handover. Hence, a different cost determination is made for each of the separate performance gains evaluated by performance gain determination unit 106.

Once the costs associated with each possible handover have been determined, a cost-adjusted gain determination unit 114 determines the actual gain, if any, that can be achieved for each possible handover. More specifically, the costs determined by handover cost determination unit 110 are applied to the performance gains identified by gain determination unit 106 to determine the actual benefit, if any, that may be achieved with each of the possible handovers. Again, in an example where handovers are possible to four different RATs, then cost-adjusted gain determination unit 114 generates four separate cost-adjusted gain values. In many cases, once costs are applied to possible performance gains, the overall cost-adjusted gain is negative, i.e. a net loss would occur if the corresponding handover were actually performed.

If the mobile terminal is in motion, a mobility compensation unit 116 may additionally be employed to address changes in costs that may arise due to the motion of the mobile terminal. In particular, mobility time and frequency factors are accessed from a mobility cost factor database 118, which are then employed to adjust the cost-adjusted gains to take into account the motion of the mobile terminal. For example, if the mobile terminal is moving at high-speed through a small RAT coverage area, then any potential gain that could be achieved by performing a handover to the RAT of that coverage area would only be temporary. Hence, even if the cost-adjusted gain for that particular RAT were positive (indicating that it would be beneficial to perform a handover to that RAT), the mobility-compensated cost-adjusted gain might be negative, or at least too low to justify a handover. As another example, if the mobile terminal is moving at high-speed through an RAT having a large coverage area composed of numerous small cells, then a high handover rate will be required even while the mobile terminal remains within the overall coverage area of the RAT. Again, even if the cost-adjusted gain for that particular RAT were positive, the mobility-compensated cost-adjusted gain might be negative.

As will be explained below, the mobility compensation need not take into account the actual speed and trajectory of the mobile terminal. Rather, mobility compensation may instead take into account the average handover rates and the like that arise due to the mobility of mobile terminals. Hence, the term "mobility compensation unit" should not be construed to imply that the MRRM must determine the actual motion of any particular mobile terminal. Also, depending upon the implementation, the mobility compensation unit 116 need not be employed if the mobile terminal is not in motion (or is moving too slowly to make any significant difference.) Moreover, in some implementations, the MRRM is not provided with mobility compensation functionality at all. In such implementations, handover decisions are made based upon the cost-adjusted gain, without consideration of device motion or handover rates.

Ultimately, the actual handover is triggered by a handover triggering unit 120 based upon the mobility-compensated cost-adjusted gain values (or merely based upon the cost-adjusted gain values without mobility compensation). To this end, the triggering unit 120 identifies the RAT providing the largest mobility-compensated cost-adjusted gain. This gain is then compared against a minimum threshold and, if it exceeds the threshold, a handover is triggered so the benefit of the handover gain can be realized. To this end, suitable signals are transmitted to the mobile terminal, to the RAT currently handling the communication session with the mobile terminal, and to the RAT identified as providing the greatest gain. The actual handover is then performed by those systems and devices using otherwise conventional handover techniques. In other implementations, the MRRM may be equipped to control the actual handover as well. (Of course, if a handover is required to maintain the communication session because the current RAT can no longer handle the session and no other RATs are available, then the handover is nevertheless performed regardless of a possible loss in overall cost-adjusted performance.)

Thus, MRRM 100 of FIG. 2 operates to identify possible handover opportunities, to determine the actual gain, if any, that might be achieved based upon the handovers, and then to selectively trigger the handovers. If implemented as a stand-alone unit, MRRM 100 is preferably equipped to process handover information for thousands or millions of mobile terminals in operation at any given time. By controlling all of the handovers for all of the mobile terminals in operation to ensure that handovers are only performed if an actual gain is achieved, a considerable gain in overall system bandwidth is thereby achieved permitting, for example, a greater number of the communication sessions to be handled simultaneously. If the MRRM functions are implemented within each individual mobile terminal, then the MRRM of a given mobile terminal only processes the handover information for itself. Nevertheless, by implementing the aforementioned MRRM functions within most or all mobile terminals so as to ensure that handovers are only performed if an actual gain is achieved, then the considerable gain in overall system bandwidth is still achieved.

Figure 3:
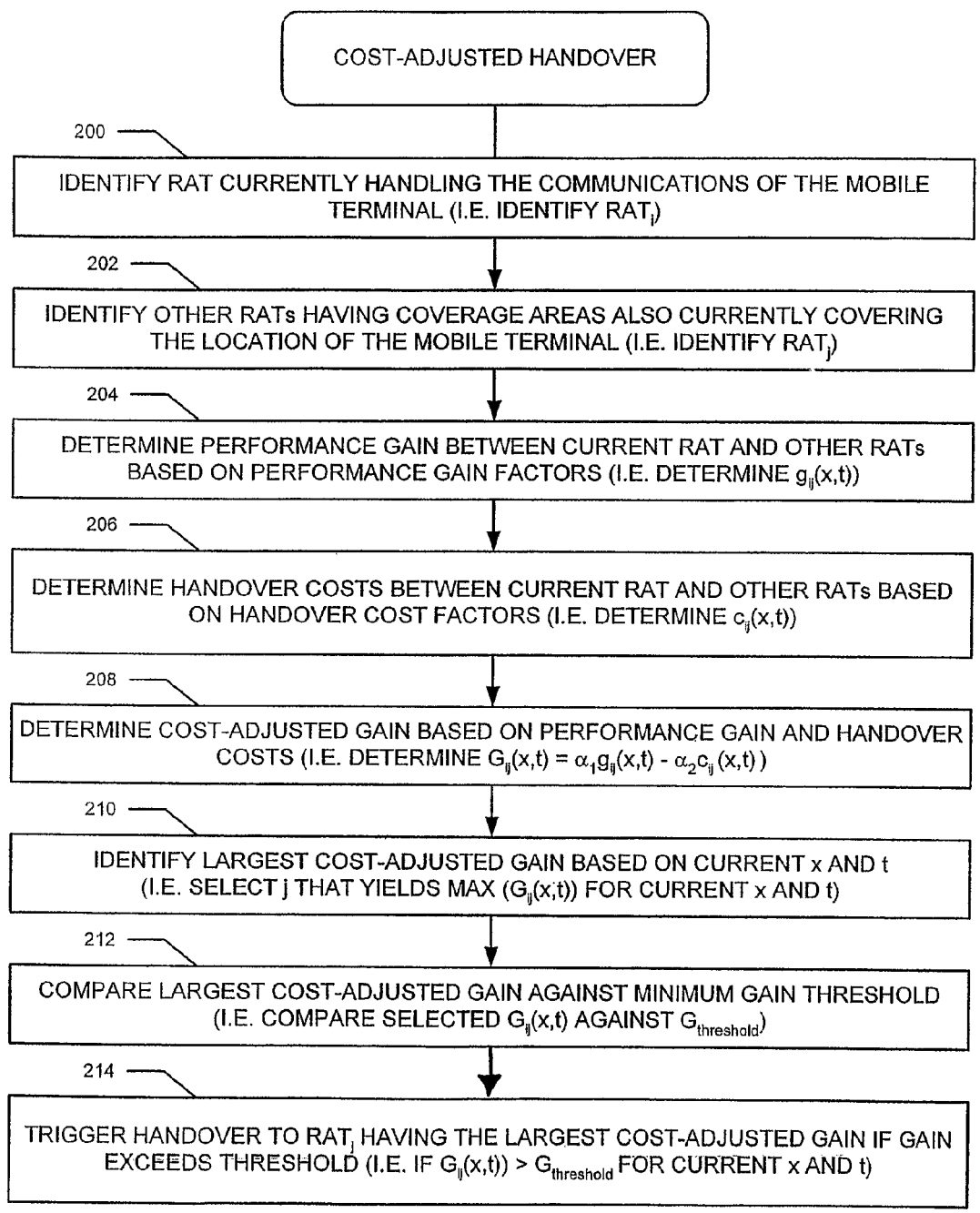
FIG. 3 summarizes steps performed by the MRRM component of FIG. 2 for controlling handover based on cost-adjusted gain values.

Turning now to FIG. 3, an exemplary method performed by MRRM 100 of FIG. 2 will now be described in greater detail for triggering handovers based upon the cost-adjusted gain values. The method of FIG. 3 is merely exemplary and the functions of the MRRM may potentially be implemented using other suitable methods as well. Moreover, the method of FIG. 3 may potentially be employed in connection with other devices or components and is therefore not limited for use with the particular MRRM of FIG. 2.

Beginning at step 200, the MRRM identifies the RAT currently handling the communications of a mobile terminal subject to possible handover between different RATs, i.e. a mobile terminal equipped with the necessary components to operate in conjunction with the different RATs. Herein, the current RAT is referred to as $RAT_i$. At step 202, the MRRM identifies other RATs having coverage areas also covering the current location of the mobile terminal. These other RATs are referred to herein as $RAT_j$ where there can be multiple values of j. At step 204, the MRRM determines the performance gain, if any, between the current RAT and the other possible RATs based on the aforementioned performance gain factors. That is, the MRRM determines a multi-access gain value $g_{i,j}(x, t)$ for each combination of the current value of i and for all of the values of j, further based on the current location "x" of the mobile terminal and the current "t". (Although, the gain value generally varies based on both "x" and "t", in some implementations only changes in "t" are considered (i.e. $g_{i,j}(t)$). In other implementations, only changes in "x" are considered (i.e. $g_{i,j}(x)$)). The specific value of $g_{i,j}(x, t)$ depends on the performance factors described above in connection with a database 108 of FIG. 2, which vary depending upon the characteristics of $RAT_i$ and $RAT_j$, the load in $RAT_i$ and $RAT_j$, the link quality in $RAT_i$ and $RAT_j$, and various other factors. Otherwise conventional techniques may be adapted for use in determining the multi-access gain. See, for example, the above-referenced Ericsson review paper.

Next, at step 206, the MRRM determines the handover costs between the current RAT and the other RATs based upon the various handover cost factors discussed above with reference to handover cost database 112 of FIG. 2. More specifically, a value of $c_{i,j}(x,t)$ is calculated for each combination of i and the various possible values of j, again based on the current location and the current time. As already explained, the costs vary according to various factors such as the current load of the RATs. Hence, fixed cost values are not employed and individual cost values are calculated and updated as needed. Generally speaking, though, handover within a given family of RATs—such with the 3G family including GSM, UMTS, and S3G or with the IEEE family including WLAN, WiMax, and IEEE 802—incurs lower costs than a handover between different families. Handovers within the 3G family have relatively modest costs since efficient handover protocols are generally available. Handovers within the IEEE family have relatively higher costs since efficient handover procedures are fully supported. Handovers from 3G to IEEE or vice versa have higher costs because inefficient handover mechanisms must be employed (based, e.g., on IP mobility). Handover costs also depend on whether the same operator is administering both RATs, with higher costs incurred for inter-operator handovers. In particular, for inter-operator handovers, authentication, security, quality of service (QoS) negotiation and charging negotiation procedures may be required, which typically dominate over any performance gain that might be achieved by the handover.

With these general considerations in mind, a variety of specific techniques may be employed for quantifying performance gains and handover costs. One technique, referred to as herein as the RAT-type approach, only takes into account the types of RATs involved and does not consider link-specific information. A suitable RAT-type based approach for specifying handover costs is to classify RATs into similar sets $S_1, S_2, \ldots, S_n$. Then for all sets, a fixed cost $c_k$ is specified for a handover of RATs within a set $S_k$. For all handover transitions between RATs of different sets $S_k S_j$, fixed costs $c_{k\to j}$ are specified. For example, all RATs that are connected to a 3G network and that allow seamless handover are included in a set $S_{3G}=\{GSM; WCDMA; HSDPA; S3G\}$. A number of IEEE 802 RATs form set $S_{802}=\{802.11; 802.16; 802.20; 802.22; 802.15\}$. For these sets, inter-set access switching costs are defined $\{c_{3G}; c_{802}\}$ depending on the efficiency of the handover. The inter-set costs depend on the mechanism and architecture to support such handovers, for example, considering that 802 RATs are connected to a 3G network via some external interworking function (e.g. a Mobile IP Home Agent beyond the Gateway GPRS Support Node (GGSN) (wherein GPRS is the General Packet Radio Service), $c_{3G\to 802}$ and $c_{802\to 3}G$ are set accordingly. Note that these costs need not be symmetric. A handover from an 802 RAT to a 3G RAT may require less connection setup signalling than in the opposite direction, particularly if the 3G RAT control connection remains active even while data is transmitted via 802. The costs "c" are preferably further based on the duration of the handover signalling procedure and the nodes that are involved, the handover procedure capabilities (seamless handover without time gap, lossless handover, etc.) and its impact on service performance.

Examples of performance gain and handover costs using a RAT-type approach are set forth in Tables I and II.

TABLE I

|  | GSM A | UMTS A | S3G A | WLAN A | WiMax A | WLAN B | WiMax C | UMTS D |
|---|---|---|---|---|---|---|---|---|
| Gain | 2 | 5 | 11 | 7 | 8 | 13 | 11 | 4 |

Table I illustrates hypothetical performance gains that may be achieved during a handover from a current RAT to various other RATs. In the example of Table I, the current RAT is another GSM RAT. Hence, performance gains to GSM A are minimal, whereas performance gains to other, different RATs are more significant, particularly the S3G RAT. The performance gain to GSM A from the current GSM RAT may arise, e.g., due to the use of more signalling power used by GSM A than used by the current GSM operator. The performance gain to other RATs from the current GSM RAT may arise, e.g., due to more efficient signalling arising in connection with those RATs such as due to the service efficiency factors discussed above. Moreover, depending upon the implementation, a separate gain table may be provided that sets forth gains that may be achieved between one service class and another. Note that Table I shows the performance gains only from one current RAT (e.g. a GSM RAT) to other potential RATs. A different set of performance gain values are used if the current RAT is a different RAT, such as if the current RAT is a different GSM operator or if the current RAT is an entirely different RAT, such as WiMAX A.

TABLE II

| HO Cost | GSM A | UMTS A | S3G A | WLAN A | WiMax A | WLAN B | WiMax C | UMTS D |
|---|---|---|---|---|---|---|---|---|
| GSM A | 3 | 4 | 4 | 7 | 7 | 12 | 12 | 6 |
| UMTS A | 4 | 1 | 1 | 7 | 7 | 12 | 12 | 5 |
| S3G A | 4 | 1 | 1 | 7 | 7 | 12 | 12 | 5 |
| WLAN A | 7 | 7 | 7 | 5 | 6 | 12 | 12 | 12 |
| WiMax A | 7 | 7 | 7 | 6 | 4 | 12 | 12 | 12 |
| WLAN B | 12 | 12 | 12 | 12 | 12 | 4 | 12 | 12 |
| WiMax C | 12 | 12 | 12 | 12 | 12 | 12 | 4 | 12 |
| UMTS D | 6 | 5 | 5 | 12 | 12 | 12 | 12 | 1 |

Table II illustrates hypothetical handover costs that may be incurred during a handover between various RATs when using the RAT-type approach. Unlike Table I, Table II provides values for each possible switch, so as to more clearly illustrate cost differences that may arise during various hypothetical handovers. As can be seen, costs are generally higher when switching from one RAT group (such as the 3G group) to another (such as the IEEE group) than when switching within a RAT group. Also, costs are generally higher when switching between RATs operated by different network operators than when switching between RATs operated by a single operator. Moreover, depending upon the implementation, a separate handover cost table may be provided that sets forth costs that may arise between one service class and another.

Because the RAT-type approach is used, the values of Table I and II are fixed, i.e. the values do not vary with time due to the current status of each RAT and do not vary with location of the mobile terminal. A link-specific extension to the RAT-type based approach may optionally be exploited to add time-varying connection specific information such as the rate or the link bandwidth-delay product that the connection employs before/after a handover, as well as the queue fill level before the handover and the service class factors discussed above. As can be appreciated, this impacts the amount of data loss and interactions with higher protocols such as TCP, Datagram Congestion Control Protocol (DCCP) and Stream Control Transmission Protocol (SCTP.) A cooperation-mode based extension may also optionally be applied for different cooperation modes of networks (e.g. for multi-operator cases). For example, the handover costs between a 3G RAT and a WLAN RAT are typically different if both RATs are provided by the same operator, as compared to a case where different operators are involved. In the later case, a larger amount of signalling might be required, e.g., to check security settings, negotiate compensation and implement cooperation schemes etc.

As can be appreciated, a variety of techniques may be employed for specifying the costs of any given handover. Otherwise routine experimentation or analysis may be employed to quantify the costs associated with any particular RAT to RAT handover. Statistical techniques may be employed to determine average performance gain factors that can be exploited, where appropriate.

At step 208, the MRRM then determines the cost-adjusted gain based on the performance gain and the handover costs, i.e. the MRRM determines $G_{i,j}(x,t)$ for the current i and for the various possible j's, again based on the current values for x and t. In one specific example, $G_{i,j}(x,t)$ is calculated via $G_{i,j}(x,t)=\alpha_1 g_{i,j}-\alpha_2 c_{i,j}$ where $\alpha_1$ and $\alpha_2$ are predetermined weighting factors. Again, otherwise routine experimentation or analysis may be employed to identify optimal weighting factors.

At step 210, the MRRM then identifies the largest of the cost-adjusted gain values based on the current values of x and t, i.e. the MRRM identifies the value of j that yields MAX($G_{i,j}(x,t)$) for the current values of x and t. At step 212, the MRRM compares largest of the cost-adjusted gains against a minimum gain threshold $G_{threshold}$ to verify that it exceeds the threshold. Assuming that $G_{i,j} > G_{threshold}$ for the selected value of j then, at step 214, the MRRM triggers a handover from $RAT_i$ to $RAT_j$ for the selected value of j, i.e. the handover is triggered to the RAT having the largest cost-adjusted gain.

Figure 4:
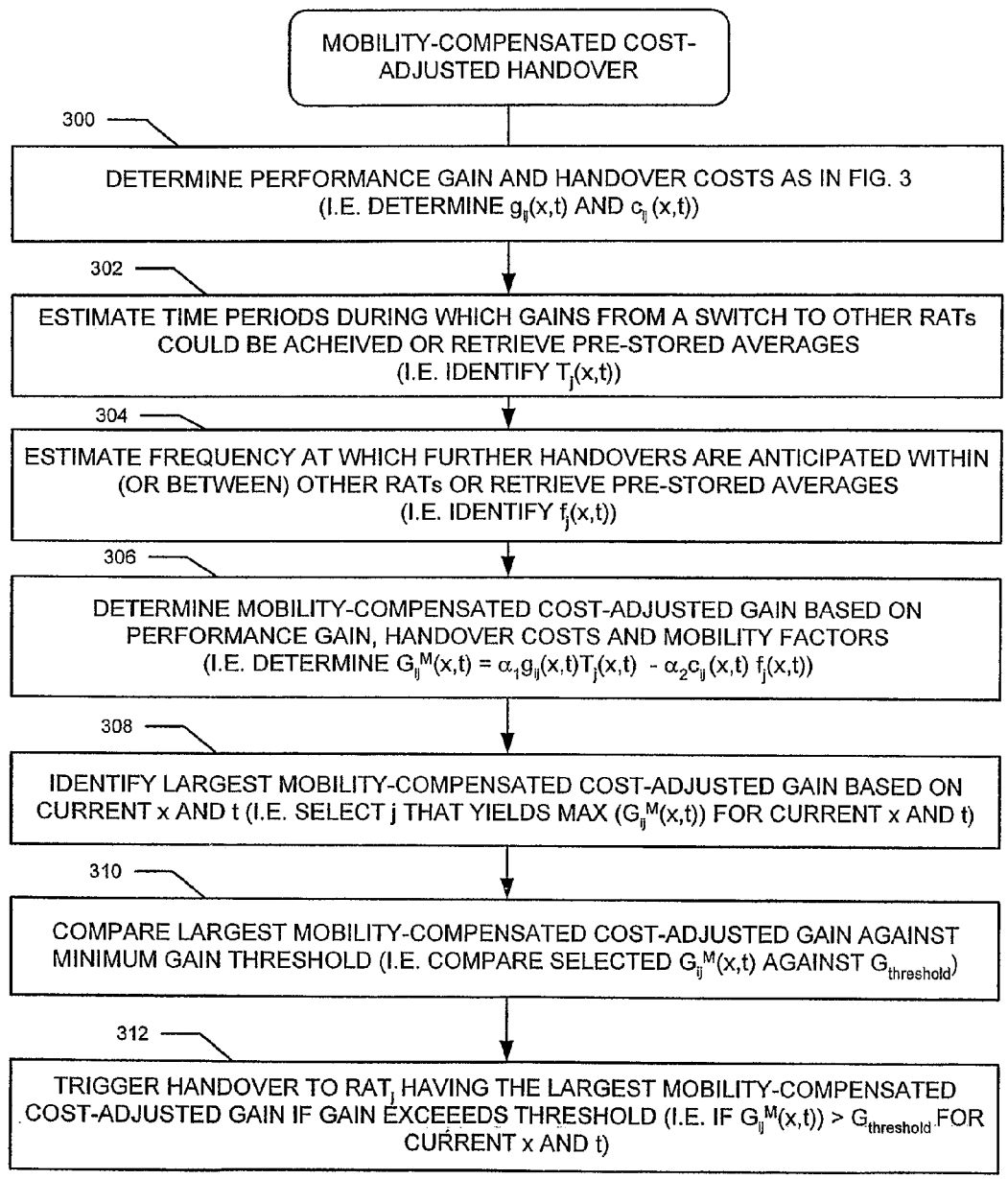
FIG. 4 summarizes steps performed by the MRRM component of FIG. 2 for controlling handover based on mobility-compensated cost-adjusted gain values.

Turning now to FIG. 4, a technique for performing mobile-compensated cost-adjusted handovers, which may be performed by the MRRM of FIG. 2, will now be described. The technique of FIG. 4 generally takes into account the trajectory and speed, if any, of the mobile terminal in determining whether to trigger a handover from the current RAT to another RAT. As will be explained, in the preferred implementation the actual trajectory of the mobile terminal need not be determined. Rather, a handover rate is used for a given RAT that is based on a statistical analysis of previous handovers within the RAT.

Beginning at step 300, the MRRM determines the performance gain and the handover costs as already described with reference to FIG. 3. At step 302, the MRRM estimates time periods $T_j$ during which any gains from a handover to each other $RAT_j$ can be achieved. In other words, for each possible handover, the MRRM estimates the amount of time during which the mobile terminal would likely remain connected to the new RAT before yet another handover might be required. This generally depends upon the size of the coverage areas as well as the direction and speed of the mobile terminal. As can be appreciated, if the mobile terminal is moving at high speed through a small coverage area, it would not likely be beneficial to trigger a handover to the RAT administering that coverage area given that the mobile terminal will not likely remain within the coverage area very long before yet another handover would be required to another RAT.

The speed and trajectory of the mobile terminal may be determined using any suitable technique. For example, if the mobile terminal is capable of transmitting its location as determined via GPS, that information may be used to determine its speed and direction. Alternatively, the sequence of coverage areas that the mobile terminal has already passed through (and the times at which the mobile terminal entered and exited the coverage areas) may be employed to gauge the speed and direction of the mobile terminal. Then, based on the speed and direction of the mobile terminal, the MRRM estimates the amount of time that the mobile terminal will likely spend in a given RAT assuming that it continues at its current speed and trajectory. The estimation may be made using information specifying the size and shape of the various coverage areas, which is preferably stored within mobility cost database 118 of FIG. 2. Alternatively, for each RAT, a pre-calculated estimate of $T_j$ is stored in a look-up table, which depends only the mobile terminal velocity. The actual velocity of a particular mobile terminal is determined and then the corresponding value for $T_j$ is retrieved. The pre-calculated estimate of $T_j$ may be determined based on a statistical analysis of the amount of time a typical mobile terminal moving at a given speed typically remains within the coverage area of the RAT. The overall estimation of the amount of time that the mobile terminal will likely spend in a given RAT may additionally take into account the link capacity of the RAT.

At step 304, the MRRM then estimates the frequency $f_j$ at which handovers are anticipated within each $RAT_j$, i.e. a handover rate is estimated. For example, if a given RAT has numerous small coverage areas, then frequent handovers may be required while the mobile terminal is connected to that RAT, even though its overall coverage area may be large. As with $T_j$, a pre-calculated estimate of $f_j$, which depends only on the mobile terminal speed, may be stored in a look-up table. The precalculated value may be derived from otherwise conventional statistical analysis based on prior handovers. Alternatively, precalculated values for $T_j$ and/or $f_j$ can be used that do not take into account the actual speed of the mobile terminal so that the speed of the terminal need not be determined. Rather, average values for $T_j$ and/or $f_j$ are pre-determined for each RAT based on a statistical analysis of mobile terminals within the RAT without regard to terminal speed. If the MRRM functions are implemented within the mobile terminals, the average values may be separately determined for each particular mobile terminal. That is, each mobile terminal records data representative of average handover rates and the like observed by that particular mobile terminal and uses that information to determine the time and frequency handover factors.

At step 306, the MRRM then determines a mobility-compensated cost-adjusted gain $G_{i,j}^M = \alpha_1 g_{i,j} T_j - \alpha_2 c_{i,j} f_j$ for each of the various $RAT_j$. (The superscript M distinguishes the mobility-compensated cost-adjusted gain of step 306 of FIG. 4 from the non-mobility-compensated cost-adjusted gain of step 208 of FIG. 3.) At steps 308-312 of FIG. 4, the MRRM triggers a handover to the $RAT_j$ that maximizes $G_{i,j}^M$ (under the condition that $G_{i,j}^M > G_{threshold}$) in accordance with techniques similar to those already described with reference to steps 210-214 of FIG. 3.

What have been described are various exemplary techniques for controlling handovers in multi-radio systems wherein handover costs and mobile terminal mobility factors are employed in the evaluation of performance gains. While the invention has been described with respect to particular embodiments, those skilled in the art will recognize that the invention is not limited to the specific embodiments described and illustrated herein. Therefore, while the invention has been described in relation to exemplary embodiments, it is to be understood that this disclosure is only illustrative. Accordingly, it is intended that the invention be limited only by the scope of the claims appended hereto.

The invention claimed is:

1. A method for use by a multi-radio wireless communication system for controlling a handover of a mobile terminal between different radio access technologies, the method comprising the steps of:
   identifying a plurality of radio access technologies including
      a current radio access technology, and
      radio access technologies other than the current radio access technology, wherein the other radio access technologies and the current radio access technology having coverage areas covering a current location of the mobile terminal;
   classifying the plurality of radio access technologies into a plurality of similar sets of radio access technologies;
   assigning a fixed handover cost for each similar set of radio access technologies among the plurality of similar sets of radio access technologies, wherein the fixed handover cost applies to handover transitions between radio access technologies within a similar set of radio access technologies;
   for each other radio access technology identified:
      determining a performance gain between the current radio access technology and the other radio access technology covering the current location of the mobile terminal based on performance gain factors,
      determining a handover cost between the current radio technology and the other radio access technology based on handover cost factors that are dependent on characteristics of the radio access technologies, wherein the handover cost includes the fixed handover cost if the current radio access technology and the other radio access technology are classified in a similar set of radio access technologies,
      determining a handover cost-adjusted gain based on the performance gain and the handover cost, and
      controlling the handover based on handover cost-adjusted gain by:
         identifying, among the other radio access technologies, a particular radio access technology having a largest handover cost-adjusted gain, and
         triggering handover of the mobile terminal to the particular radio access technology having the largest handover cost-adjusted gain.

2. The method of claim 1, wherein the handover controlling step is performed for a plurality of mobile terminals in operation at a given time.

3. The method of claim 1, wherein the step of triggering handover of the mobile terminal is only performed if the handover cost adjusted gain of the radio access technology to receive the handover exceeds a minimum threshold.

4. The method of claim 1, wherein the performance gain factors depend on at least one of the radio access technologies and characteristics of a particular service class.

5. The method of claim 4, wherein the performance gain factors are representative of one or more of the frequency band, data rate, security support, free capacity, cell load, signal strength, channel quality, service efficiency, and spectral efficiency of the radio access technologies.

6. The method of claim 1, wherein the handover cost factors are representative of one or more of data loss, switching delay, signaling overhead, protocol interaction, link characteristics, switching algorithms, switching point locations of the radio access technologies and characteristics of a particular service class.

7. The method of claim 1, wherein the handover cost adjusted gain is further adjusted based on terminal mobility.

8. The method of claim 7, wherein the adjustments based on the terminal mobility are based on average handover rates of the radio access technologies.

9. The method of claim 1, further comprising the steps of:
   estimating time periods during which gains from a switch to another radio access technology can be achieved based on motion of the mobile terminal and estimating the frequency at which handovers are anticipated within another radio access technology based on the motion of the mobile terminal; and
   determining a mobility-compensated handover cost-adjusted gain based on performance gain, handover costs, and at least one of the estimated time periods and the estimated frequencies.

10. The method of claim 9, wherein the steps of identifying the radio access technology having the largest handover cost-adjusted gain and triggering handover of the mobile terminal to the radio access technology having the largest handover cost-adjusted gain are performed using the mobility-compensated handover cost-adjusted gain.

11. The method of claim 1, further comprising the steps of:
   retrieving prestored average time periods during which gains from a switch to another radio access technology are achieved or retrieving prestored average handover rates at which handovers occur within another radio access technology; and
   determining a mobility-compensated handover cost-adjusted gain based on performance gain, handover costs, and at least one of the average time period and the average handover rate.

12. The method of claim 1 wherein the radio access technologies exploit one or more of GSM, UMTS, S3G, WLAN, WiMAX, high speed download packet access (HSDPA) technologies, and IEEE-specified technologies including 802.11; 802.16; 802.20; 802.22; and 802.15 protocols.

13. The method of claim 1 wherein different operators operate the different radio access technologies and the handover cost-adjusted gain depends on the particular operator.

14. The method of claim 1, further comprising:
   assigning a fixed performance gain for each similar set of radio access technologies among the plurality of similar sets of radio access technologies, wherein the fixed performance gain applies to handover transitions between radio access technologies within a similar set of radio access technologies.

15. The method of claim 14, wherein the determining a performance gain further comprises:
determining the performance gain between the current radio access technology and the other radio access technology based on performance gain factors, wherein the performance gain includes the fixed performance gain if the current radio access technology and the other radio access technology are classified in a similar set to radio access technologies.

16. A device for use by a multi-radio wireless communication system for controlling a handover of a mobile terminal between different radio access technologies, the device comprising:
a coverage area determination unit for identifying a plurality of radio access technologies including
a current radio access technology, and
radio access technologies other than the current radio access technology, wherein the other radio access technologies and the current radio access technology having coverage areas covering a current location of the mobile terminal;
a classification unit for classifying the plurality of radio access technologies into a plurality of similar sets of radio access technologies;
an assignment unit for assigning a fixed handover cost for each similar set of radio access technologies among the plurality of similar sets of radio access technologies, wherein the fixed handover cost applies to handover transitions between radio access technologies within a similar set of radio access technologies;
a performance gain determination unit for determining, for each other radio access technology identified,
a performance gain between a current radio access technology and another radio access technology covering the current location of the mobile terminal based on performance gain factors,
a handover cost determination unit for determining a handover cost between the current radio access technology and the other radio access technology based on handover cost factors that are dependent on characteristics of the radio access technologies, wherein the handover cost includes the fixed handover cost if the current radio access technology and the other radio access technology are classified in a similar set of radio access technologies, and
a cost-adjusted gain determination unit for determining a handover cost-adjusted gain value based on the performance gain and the handover cost; and
a handover triggering unit operative to control the handover based on the handover cost-adjusted gain values by
identifying, among the other radio access technologies, a particular radio access technology having the largest handover cost adjusted gain, and
selectively triggering handover of the mobile terminal to the particular radio access technology having the largest handover cost-adjusted gain.

17. The device of claim 16, adapted to control handovers for a plurality of mobile terminals in operation at a given time.

18. The device of claim 16, wherein the device is implemented as a stand-alone component separated from the radio access technologies, as a component of the multi-radio network controller, or as a component within one of the radio access technologies.

19. The device of claim 16, wherein the device is incorporated within a base station controller or a radio network controller.

20. The device of claim 16, wherein sub-components of the device are distributed among various components of the multi-radio wireless communication system.

21. The device of claim 16, the handover triggering unit further comprising comprises means-for triggering handover of the mobile terminal only if the handover cost-adjusted gain of the radio access technology to receive the handover exceeds a minimum threshold.

22. The device of claim 16, further comprising:
a mobility compensation unit for compensating the handover cost-adjusted gain based on mobility.

* * * * *

UNITED STATES PATENT AND TRADEMARK OFFICE
CERTIFICATE OF CORRECTION

PATENT NO. : 8,213,382 B2
APPLICATION NO. : 11/915706
DATED : July 3, 2012
INVENTOR(S) : Sachs et al.

Page 1 of 1

It is certified that error appears in the above-identified patent and that said Letters Patent is hereby corrected as shown below:

In the Specification:

In Column 10, Line 12, delete "$c_{802->3}G$" and insert -- $c_{802->3G}$ --, therefor.

In the Claims:

In Column 16, Line 34, in Claim 21, delete "comprising comprises means-for" and insert -- comprising means for --, therefor.

Signed and Sealed this
Sixteenth Day of July, 2013

Teresa Stanek Rea
*Acting Director of the United States Patent and Trademark Office*